(No Model.)
T. E. LEWIS.
CAR COUPLING.
No. 459,296. Patented Sept. 8, 1891.
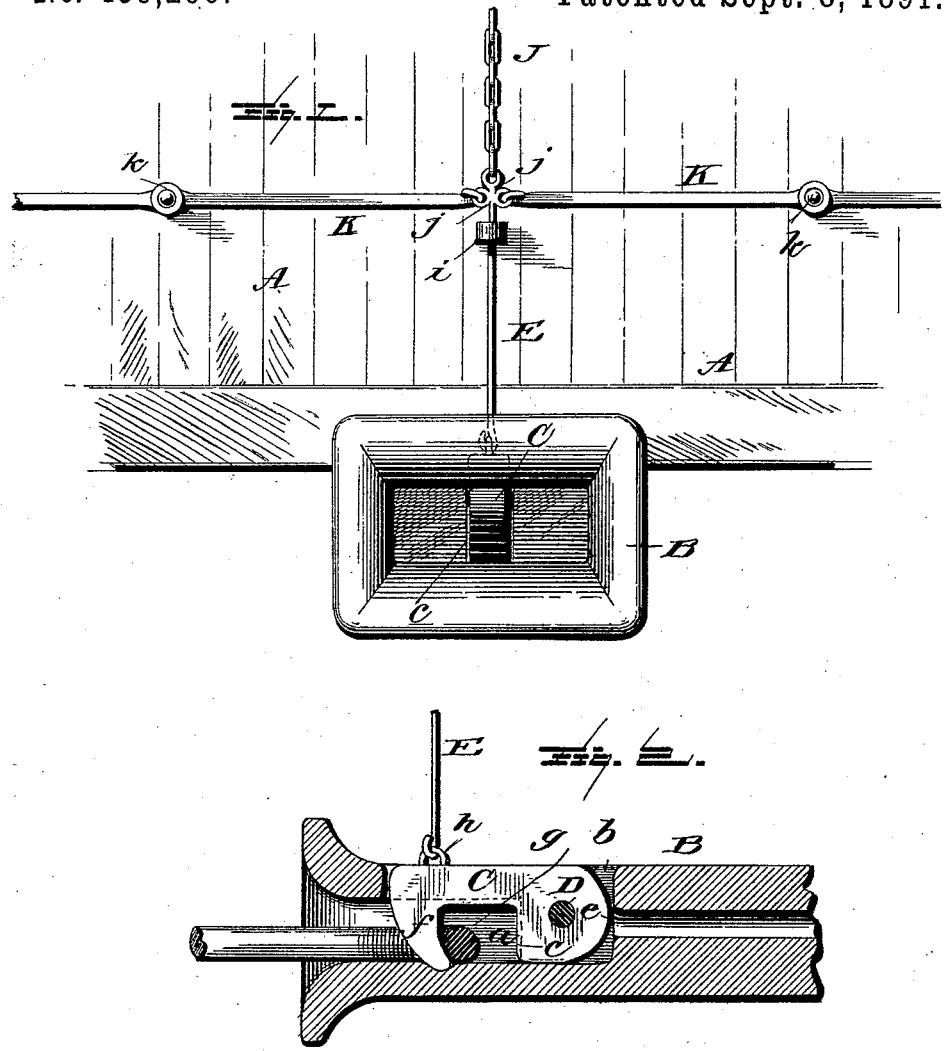
Witnesses
L. C. Hills.
E. H. Bond.
Inventor:
Thomas E. Lewis,
E. B. Stocking.
Attorney

UNITED STATES PATENT OFFICE.

THOMAS E. LEWIS, OF DUBLIN, TEXAS.

CAR-COUPLING.

SPECIFICATION forming part of Letters Patent No. 459,296, dated September 8, 1891.

Application filed March 30, 1891. Serial No. 386,928. (No model.)

*To all whom it may concern:*

Be it known that I, THOMAS E. LEWIS, a citizen of the United States, residing at Dublin, in the county of Erath, State of Texas, have invented certain new and useful Improvements in Car-Couplings, of which the following is a specification, reference being had therein to the accompanying drawings.

This invention relates to certain new and useful improvements in car-couplings; and it has for its objects, among others, to provide a simple, cheap, and durable and efficient car-coupler composed of a minimum number of parts. I form in the upper face of the draw-head a recess communicating with the chamber of the draw-head, and in this recess I pivot the coupling-dog, which is provided between its ends with a notch, between the rear and front walls of which the coupling-link plays, the said rear and front walls serving to limit the movement of the link when two cars are coupled. The front end of the coupling-dog is formed into a hook, the rear wall of which is formed on a curve or substantially undercut, the rear end being on a curve to aid in the movement of the dog on its pivot. The peculiar construction of the dog and its location and manner of pivoting renders it impossible for two cars to uncouple when under strain. When the cars are coupled the dog has a firm bearing upon the bottom of the chamber of the draw-head upon both sides of the notch in the dog. Suitable means are provided for uncoupling from either side or the top of the car.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is an end view of a portion of a car with my improvements applied. Fig. 2 is a central longitudinal vertical section through the draw-head.

Like letters of reference indicate like parts in both views where they occur.

Referring now to the details of the drawings by letter, A designates a portion of the end of a car, and B the draw-head, which, as shown in Fig. 2, is formed with the usual flaring mouth communicating with a chamber $a$, which, however, is closed at the bottom, as seen in Fig. 2. In the top wall of the draw-head is formed a recess or opening $b$, which communicates with the chamber of the draw-head, and within this recess and the chamber is pivoted the coupling-dog C, which is pivoted on the transverse pin D held in the side walls of the chamber of the draw-head, as seen clearly in Fig. 2. To the front of the pivot of the dog the chamber of the draw-head is formed with shoulders $c$, as shown in Fig. 1 and by dotted lines in Fig. 2, and against which the inner end of the link is designed to impinge when the cars come together, so as to prevent injury to the dog or its pivot. The rear end of the dog is rounded, as seen at $e$, to aid in its turning on its pivot, and the upper face of the dog is designed to be flush with the upper face of the draw-head when in its closed position and substantially close the recess therein. The front end of the dog is formed into a hook $f$, as seen in Fig. 2, and the rear face of this hook is formed on a curve or under-cut, as shown in said Fig. 2, for a purpose hereinafter specified. The formation of this hook provides a notch $g$ in the under face of the dog, between the front and rear walls of which the coupling-link is designed to be engaged and held when the cars are coupled or when one car is provided with the link ready for coupling with another.

In operation, supposing one car to be carrying the link held in a horizontal position and the dog of the adjoining car held in the position in which the dog is shown in Fig. 2, as the cars approach each other the end of the link enters beneath the hook end of the dog, which rises to allow the link to enter the chamber of the draw-head, and as soon as the link has passed the hook end the dog falls and the link is held in the notch of the dog, as shown in Fig. 2. If the cars come together with considerable force, the shoulders of the chamber of the draw-head receive the force of the link and prevent injury to the dog or its pivot. The dog when down has a firm bearing upon the bottom of the chamber, as seen in Fig. 2. The curve or undercut hook serves to effectually prevent rising of the dog when the cars are under strain, for any tendency to rise on the dog is resisted by the rear wall of the dog, the bearing of the link thereon being in line with or below the pivot of the dog, as seen in Fig. 2.

In order to provide for uncoupling from the side or top of the car, I have provided the upper face of the dog near its forward end with an eye or analogous provision $h$, to which is connected the lower end of the vertical rod E, which passes through a suitable guide $i$ on the end of the car and at its upper end provided with a head having three eyes or openings $j$, one arranged vertically and the other two horizontally. To the upper one is connected a rod or chain J, extending to the top of the car, and to the other two are connected the levers K, pivoted at $k$ to the end of the car and extended beyond the sides of the car, as will be understood from Fig. 1.

It is deemed important that the bottom of the chamber in the draw-head be on the same plane on each side of the depression therein, as seen in Fig. 2, so that the link will enter in a horizontal position, and the pivot of the dog being above the contact-point of the link inward pressure on the link will only the more firmly hold the hook end of the dog down, instead of tending to raise it up.

What I claim as new is—

The combination, with the draw-head having a chamber and a recess from its upper face into the chamber, of a dog pivoted in the recess and having a notch in its under face and a hook at its forward end, the vertical movable rod connected with the dog and guided in its vertical movement by a guide $i$, and at its upper end provided with two horizontal and one vertical eyes and the chain and levers connected with the said eyes, substantially as shown and described, and for the purpose specified.

In testimony whereof I affix my signature in presence of two witnesses.

THOMAS E. LEWIS.

Witnesses:
H. W. TUCKER,
H. F. STEVENSON.